United States Patent [19]

Kornfeld et al.

[11] Patent Number: 5,758,266
[45] Date of Patent: May 26, 1998

[54] MULTIPLE FREQUENCY COMMUNICATION DEVICE

[75] Inventors: Richard K. Kornfeld, San Diego; Charles E. Wheatley, III, Del Mar, both of Calif.

[73] Assignee: QUALCOMM Incorporated, San Diego, Calif.

[21] Appl. No.: 316,188

[22] Filed: Sep. 30, 1994

[51] Int. Cl.[6] .................................................. H04B 1/40
[52] U.S. Cl. .......................... 455/86; 455/33.2; 455/56.1; 455/59; 455/253.2; 375/267
[58] Field of Search ................. 455/33.1, 33.2, 455/75, 76, 86, 313–316, 303, 69, 59, 101, 103, 132, 137, 102, 275, 138, 276.1, 56.1, 234.1, 245.1, 253.2; 375/267, 347

[56] References Cited

U.S. PATENT DOCUMENTS

| | | | |
|---|---|---|---|
| 4,259,742 | 3/1981 | Burns et al. | 455/52.1 |
| 4,494,238 | 1/1985 | Groth | 375/1 |
| 4,584,716 | 4/1986 | Drentea . | |
| 5,095,531 | 3/1992 | Ito | 455/33 |
| 5,129,098 | 7/1992 | McGirr et al. | 455/69 |
| 5,231,632 | 7/1993 | Yamao et al. | 370/69.1 |
| 5,239,697 | 8/1993 | Kosuga | 455/133 |
| 5,257,283 | 10/1993 | Gilhousen et al. | 375/1 |
| 5,267,261 | 11/1993 | Blakeney, II et al. . | |
| 5,274,836 | 12/1993 | Lux | 455/1 |
| 5,291,474 | 3/1994 | Ikonen et al. | 370/30 |
| 5,319,795 | 6/1994 | Hamabe et al. | 455/33.2 |
| 5,321,850 | 6/1994 | Backstrom et al. | 455/139 |
| 5,432,779 | 7/1995 | Shimo et al. | 370/30 |
| 5,457,813 | 10/1995 | Poutanen | 455/70 |
| 5,493,695 | 2/1996 | Aitkenhead et al. | 455/54.1 |
| 5,530,925 | 6/1996 | Garner | 455/273 |

FOREIGN PATENT DOCUMENTS

| | | |
|---|---|---|
| 0270112 | 6/1988 | European Pat. Off. . |
| 0430106 | 6/1991 | European Pat. Off. . |

*Primary Examiner*—Reinhard J. Eisenzopf
*Assistant Examiner*—Lee Nguyen
*Attorney, Agent, or Firm*—Russell B. Miller; Roger W. Martin

[57] ABSTRACT

The dual band code division multiple access radio of the present invention operates on multiple frequencies simultaneously on either transmit or receive. The transmit path operates by splitting the transmit intermediate frequency (IF) path (103) and mixing the IF to two different transmit frequencies using two frequency synthesizers (140 and 145). The receive path (104) has two RF channels (116 and 117) that are mixed with the frequencies generated by the synthesizers (140 and 145) and summed into one IF strip. Thus the radio of the present invention can perform a soft hand-off between frequencies while communicating with both base stations simultaneously. Additional mixing paths and synthesizers can be added if it is desired to communicate with more than two base stations simultaneously.

16 Claims, 3 Drawing Sheets

MULTIPLE FREQUENCY COMMUNICATION DEVICE

BACKGROUND OF THE INVENTION

I. Field of the Invention

The present invention relates to radio communications. More particularly, the present invention relates to radios having the capability of communicating over more than one frequency simultaneously.

II. Description of the Related Art

There are presently numerous different radiotelephone systems. The cellular analog advanced mobile phone system (AMPS), the two digital cellular systems: code division multiple access (CDMA) and time division multiple access (TDMA), or the new personal communication systems (PCS) that can use both TDMA and CDMA technologies. The CDMA cellular system is described in greater detail in Telecommunications Industry Association/Electronic Industries Association (TIA/EIA) Interim Standard IS-95.

The CDMA cellular system and the CDMA PCS share some common attributes. They are typically composed of numerous fixed base stations, each base station transmitting over a forward channel in a cellular area to one or more mobile radios.

The cell's base station is connected to the public switched telephone network (PSTN). This enables a mobile radio transmitting within the cell, over a reverse channel, to communicate with a land line telephone through the base station. Additionally, a mobile radio can communicate through the base stations and the PSTN to another mobile radio in the same cell or another cell.

In a CDMA cellular telephone system or a CDMA PCS, a common frequency band is used for communication with all base stations in a system. The common frequency band allows simultaneous communication between a mobile radio and more than one base station. The transmitters operate at a low power allowing the frequencies to be reused in nearby systems without substantial interference.

Signals occupying the common frequency band are discriminated at the receiving terminal (either within the mobile radio or base station) through the spread spectrum CDMA waveform properties based on the use of high speed pseudo noise (PN) codes and orthogonal Walsh codes. The high speed PN codes and orthogonal Walsh codes are used to modulate signals transmitted from the base stations and the mobile radios. Transmitting terminals (either within a mobile radio or within a base station), using different PN codes or PN codes that are offset in time, produce signals that can be separately received at the receiving terminal.

In a typical CDMA system, each base station transmits a pilot signal having a common PN spreading code that is offset in code phase from the pilot signal of other base stations. During system operation, the mobile radio is provided with a list of code phase offsets corresponding to neighboring base stations surrounding the base station through which communication is established. The mobile radio is equipped with a searching element that allows the mobile radio to acquire and track the signal strength of the pilot signal from a group of base stations including the neighboring base stations.

CDMA technology provides for soft hand-off between cells across one frequency by the changing of code phase offsets. When there is a need to use more than one frequency so that a hand-off between two frequencies is required, a hard hand-off is performed. Hand-off between sectors of one cell across one frequency is referred to in the art as a softer hand-off.

A method and system for providing a communication with the mobile radio through more than one base station during the hand-off process are disclosed in U.S. Pat. No. 5,267,261 issued Nov. 30, 1993, titled Mobile Assisted Soft Hand-Off In a CDMA Cellular Telephone System and assigned to the assignee of the present invention. Using this system, communication between the mobile radio and the end user is uninterrupted by the eventual hand-off from an original base station to a subsequent base station. This type of hand-off may be considered as a "soft" hand-off in that communication with the subsequent base station is established before communication with the original base station is terminated. When the mobile radio is in communication with two base stations, a single signal for the end user is created from the signals from each base station by a cellular or personal communication system controller.

Mobile radio assisted soft hand-off operates based on the pilot signal strength of several sets of base stations as measured by the mobile radio. The Active Set is the set of base stations through which active communication is established. The Neighbor Set is a set of base stations surrounding an active base station comprising base stations that have a high probability having a pilot signal strength of sufficient level to establish communication. The Candidate Set is a set of base stations having a pilot signal strength of sufficient level to establish communication.

When communications are initially established, a mobile radio communicates through a first base station and the Active Set contains only the first base station. The mobile radio monitors the pilot signal strength of the base stations of the Active Set, the Candidate Set, and the Neighbor Set. When a pilot signal of a base station in the Neighbor Set exceeds a predetermined threshold level, the base station is added to the Candidate Set and removed from the Neighbor Set at the mobile radio.

The mobile radio communicates a message to the first base station identifying the new base station. A cellular or PCS controller decides whether to establish communication between the new base station and the mobile radio. Should the cellular or PCS controller decide to do so, the controller sends a message to the new base station with identifying information about the mobile radio and a command to establish communications with the mobile radio.

A message is also transmitted to the mobile radio through the first base station. The message identifies a new Active Set that includes the first and the new base stations. The mobile radio searches for the new base station's transmitted information signal and communication is established with the new base station without termination of communication through the first base station. This process can continue with additional base stations.

When the mobile radio is communicating through multiple base stations, it continues to monitor the signal strength of the base stations of the Active Set, the Candidate Set, and the Neighbor Set. Should the signal strength corresponding to a base station of the Active Set drop below a predetermined threshold for a predetermined period of time, the mobile radio generates and transmits a message to report the event. The cellular or PCS controller receives this message through at least one of the base stations with which the mobile radio is communicating. The controller may decide to terminate communications through the base station having a weak pilot signal strength.

The controller, upon deciding to terminate communications through a base station, generates a message identifying a new Active Set of base stations. The new Active Set does not contain the base station through which communication is to be terminated. The base stations through which communication is established send a message to the mobile radio. The controller also communicates information to the base station to terminate communications with the mobile radio. The mobile radio communications are thus routed only through base stations identified in the new Active Set.

Because the mobile radio is communicating with the end user through at least one base station at all times throughout the soft hand-off process, no interruption in communications occurs between the mobile radio and the end user. A soft hand-off provides significant benefits in its inherent "make before break" communication over conventional hard hand-off or "break before make" techniques employed in other cellular communication systems.

When a mobile radio moves from one cell to another, the radio may need to change frequencies, i.e., execute a hard hand-off. This frequency change in PCS may be due to the use of Operational Fixed Services (OFS) that share the PCS spectrum. Near these OFS's, the PCS mobile cannot use the OFS frequency in order to avoid interference. The PCS mobile, therefore, has to change frequencies in these areas.

In handing-off from one frequency to another, the mobile radio searches the Neighbor Set for another pilot channel, synchronizing channel, paging channel, and traffic channel. If only the pilot and/or synchronizing channels are present, the mobile radio moves on to the next frequency.

The problem with a soft hand-off from one frequency to another is that as the mobile radio searches the Neighbor Set for other pilot channels, the synthesizer must change frequencies rapidly while allowing a settling time of 2 milliseconds on the frequency to enable the frequency to stabilize. This is difficult to accomplish and requires a more complex design to do so. Additionally, the mobile must leave the frequency being used, causing an interruption in communications. There is a resulting need for an economical radio that can rapidly communicate over multiple frequencies, thus allowing the mobile radio to efficiently perform a soft hand-off between frequencies.

SUMMARY OF THE INVENTION

The present invention encompasses a multiple band radio that can transmit and receive multiple frequency signals simultaneously. The radio has a transmit path and a receive path. The transmit path is comprised of a plurality of mixing paths. Each mixing path has an amplifier whose input is coupled to the signal to be transmitted. The output of each amplifier is coupled to an input of a mixer. Another input of the mixers is coupled to an output of a frequency synthesizer. The resulting signals from the mixers are summed by a summer. The sum signal is input to a power amplifier which inputs the signal to an antenna to be radiated.

The receive path is comprised of an amplifier coupled to the antenna for amplifying received signals. The output of the amplifier is input to a plurality of down converting paths. Each down converting path has a mixer coupled to the amplified signal. Another input of each mixer is coupled to the frequency synthesizers. The resulting down converted signals are input to filters. The output of each filters is input to a variable gain amplifier. The amplified signals from the down converting paths are input to a summer. The sum signal is then input to a common filter that generates a signal for use by the rest of the radio.

The multiple frequency synthesizers in combination with the multiple transmit and receive paths enables the apparatus of the present invention to transmit and receive on multiple frequencies simultaneously, communicate on one frequency while searching others, and to perform a soft hand-off between frequencies. This alleviates the problem of the prior art of settling time of a frequency synthesizer since the frequency synthesizers do not have to change frequencies as rapidly and as frequently as previously required. It also avoids an interruption in communications, as normally results from monitoring one frequency at a time.

DETAILED DESCRIPTION OF THE PREFERRED EMBODIMENT

The apparatus and method of the present invention enables a mobile radio to operate on multiple frequencies. By increasing the number of intermediate frequency paths in the radio and separately mixing each signal to be transmitted to different frequencies, the number of frequencies that the radio can communicate over is increased. The use of CDMA technology then allows these signals to be separated later.

Figure 1:
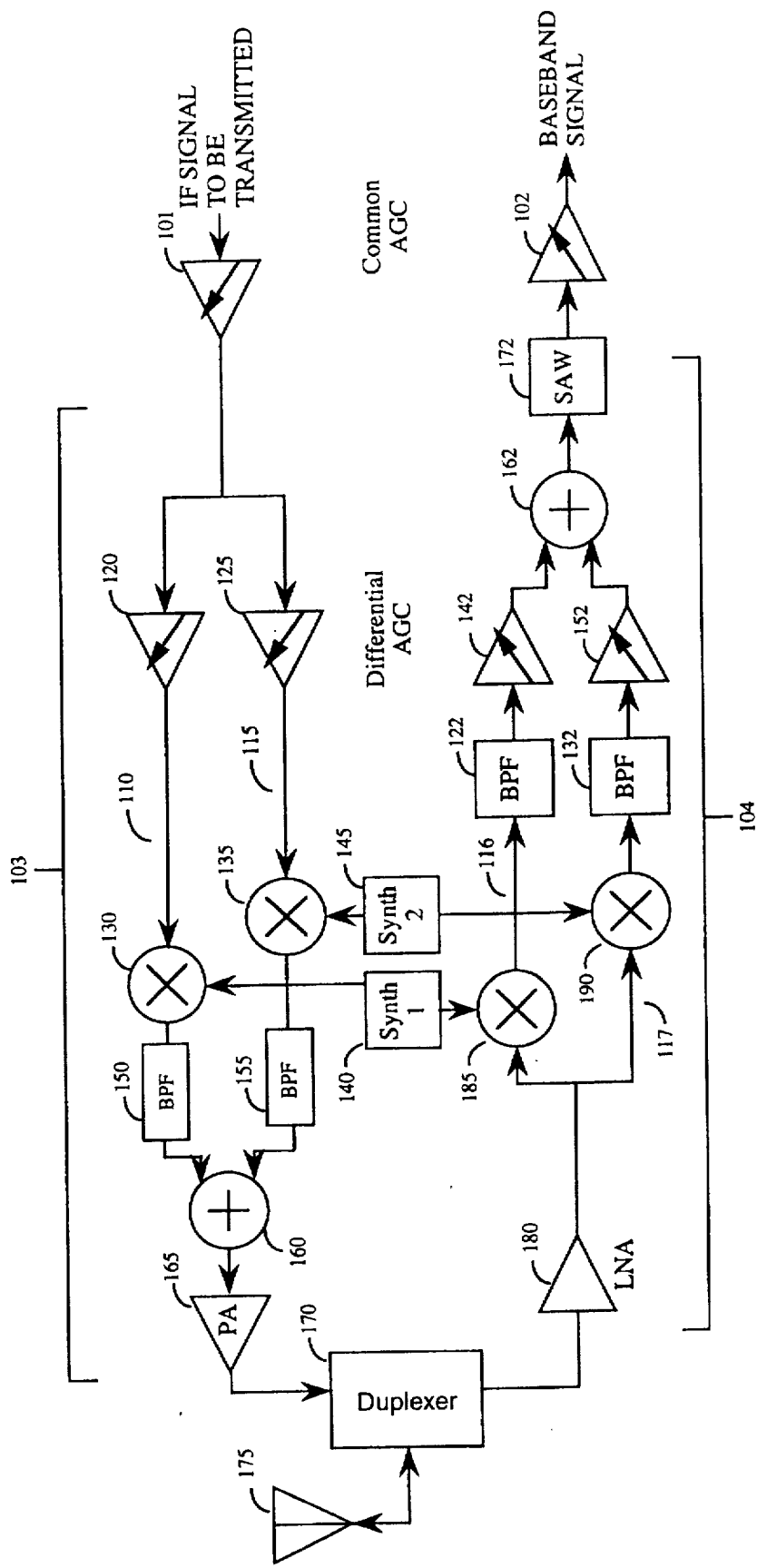
FIG. 1 shows a block diagram of the multiple band radio of the present invention.

The apparatus of the present invention is illustrated in FIG. 1. The apparatus is comprised of a transmit path (103) and a receive path (104). Both the transmit (103) and receive paths (104) have a common automatic gain control (AGC) amplifier (101 and 102) for amplifying a signal at the intermediate frequency. In the preferred embodiment, the receive intermediate frequency is 85 MHz and transmit intermediate frequency is 130 MHz. Alternate embodiments use other intermediate frequencies.

The common AGC amplifiers (101 and 102) are used for both open loop power control and closed loop power control of the radio. Open loop power control is explained in greater detail in U.S. Pat. No. 5,056,109 to Gilhousen et al. and assigned to Qualcomm, Incorporated. Open loop power control is accomplished by the radio estimating the path loss of the forward link based on the total power received by the radio. The total power is the sum of the power from all base stations operating on the same frequency assignment as perceived by the radio. From the estimate of the average forward channel loss, the radio sets the transmit level of the reverse channel signal to compensate for the channel loss. Closed loop power control is accomplished through commands from the base station.

The apparatus of the present invention performs this power control using the common AGC amplifiers (101 and 102). When a signal is received by the radio, the gain of the receive common AGC amplifier (102) is adjusted so that the gain of the receiver is substantially equal to the gain of the transmitter minus 73 dB. The difference is the estimated path loss.

The transmit path (103) of the apparatus of the present invention is further comprised of multiple mixing paths (110 and 115). In the preferred embodiment, there are two mixing paths (110 and 115) enabling the radio to communicate on two different frequencies simultaneously. Alternate embodiments could use more than two mixing paths to enable the radio to communicate with a larger number of base stations.

Each mixing path (110 and 115) contains a differential AGC amplifier (120 and 125) each feeding the input of a mixer (130 and 135). These amplifiers (120 and 125) have a variable gain that is adjustable over a 20 dB range, in the preferred embodiment. Alternate embodiments have different ranges for the amplifier gain.

The inputs to the differential AGC amplifiers (120 and 125) are coupled to the output of the transmit common AGC amplifier (101). The differential AGC amplifiers (120 and 125) amplify the signal to be transmitted. During normal operation of the radio, the gain of one of the amplifiers is set to zero. When the radio is handing-off or searching another frequency, the gains are approximately equal. If it is desired to change the hand-off region of the system, one gain can be increased over the other. This increases the transmit power of one signal over the other and therefore the distance the radio can operate from the base station using the frequency of the higher power signal.

Frequency synthesizers (140 and 145) are coupled to the other inputs of the mixers (130 and 135). These synthesizers (140 and 145), in the preferred embodiment, are variable frequency synthesizers that cover the frequency spectrum set aside for either the cellular radiotelephone systems or the personal communication systems. The frequency output by the synthesizers (140 and 145) is controlled by the radio's microcontroller. The radio receives instructions from the base stations on what frequency to operate and the microcontroller varies the frequency of the synthesizers (140 and 145) so that the radio transmits and receives at these frequencies.

Each mixer (130 and 135) in the mixing paths (110 and 115) multiplies the signal from its respective differential AGC amplifier (120 or 125) with the signal from the respective frequency synthesizer (140 or 145). The outputs of both mixers (130 and 135) are combined by a summer (160). The sum signal is amplified by a power amplifier (165). In the preferred embodiment, the amplifier (165) is set at a gain of approximately 30 dB. Alternate embodiments use other gains depending on the noise levels of the components.

The amplified signal is input to a duplexer (170) that is connected to an antenna (175). The duplexer (170) enables the antenna (175) to be connected to both the transmit (103) and receive paths (104) by separating the transmitted signals from the received signals.

The receive path (104) is comprised of a low noise amplifier (180) feeding multiple down converting paths (116 and 117), each path down converting a received signal to the same IF frequency. The low noise amplifier amplifies the received signal by a gain of 20 dB in the preferred embodiment.

In the preferred embodiment, the amplified signal is input to the two down converting paths (116 and 117). Alternate embodiments use more down converting paths if it is desired to communicate with more than two base stations simultaneously.

Each down converting path (116 and 117) is comprised of a mixer (185 and 190) that combines the frequency from one of the frequency synthesizers (140 or 145) with the received, amplified signal. Therefore, if a mixing path (110 or 115) operates at a frequency of 850 MHz, there is a corresponding down converting path (116 or 117) that also operates at that frequency offset by the duplexor offset. Band pass filters (122 and 132) are used to filter the signals from the mixers (185 and 190).

The outputs of the bandpass filters (122 and 132) are each amplified by a differential amplifier (142 and 152). The amplifiers (142 and 152) operate in a similar fashion to the differential amplifiers (120 and 125) in the transmit path. The receive differential amplifiers (142 and 152) normally have a gain that is approximately equal. The gain of one can be offset from the other, however, to emphasize one signal frequency over the other. This enables the mobile to monitor either frequency channel or both at once.

The outputs of the receive differential amplifiers (142 and 152) are input to a summer (162) that adds them together. The sum signal from the summer (162) is input to a bandpass filter (172) for filtering. In the preferred embodiment, this bandpass filter (172) is a surface acoustic wave (SAW) filter. The filtered signal is input to the common AGC amplifier (102) that was explained in greater detail above. The amplified signal from this amplifier (102) is then input to the radio's circuitry for further processing as is already known in the art. TIA/EIA IS-95 describes this processing in greater detail.

Figure 2:
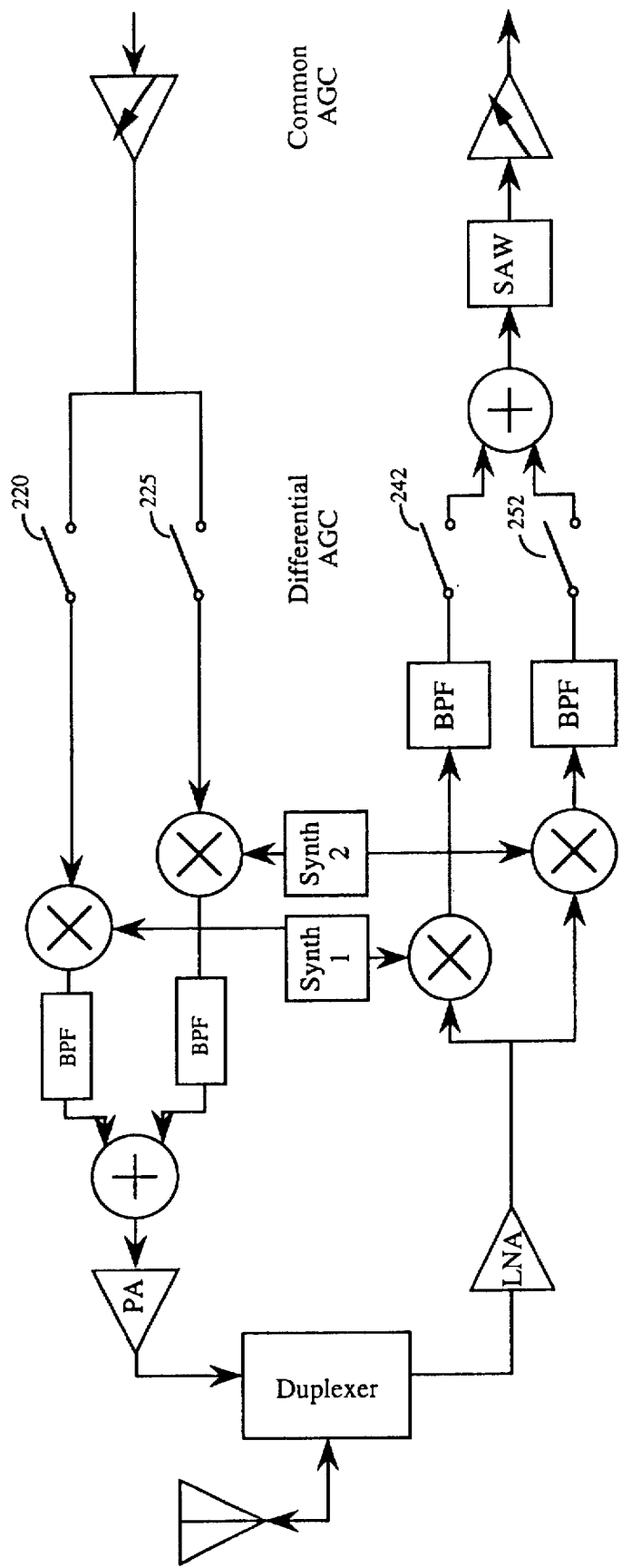
FIG. 2 shows an alternate embodiment of the multiple band radio of the present invention.

If the differential AGC amplifiers (120, 125, 142, and 152) are always set equal, in other words the hand-off region is always at the equal power point, the amplifiers (120, 125, 142, and 152) can be replaced by switches (220, 225, 242, and 252). Such an embodiment is illustrated in FIG. 2. The switches can take the form of diodes, transistors, relays, or other switch devices to allow the circuit to be simplified.

This alternate embodiment operates in a similar fashion to the preferred embodiment, the difference being the switches. The switch position is controlled by the radio's microcontroller, depending on the number of frequencies required by the radio. If the radio is not operating near the hand-off region of the cellular system, only one frequency is required and, therefore, only one switch in each path is closed. As the radio approaches the hand-off region, the second switch in each path is closed to enable the radio to communicate over multiple frequencies.

Figure 3:
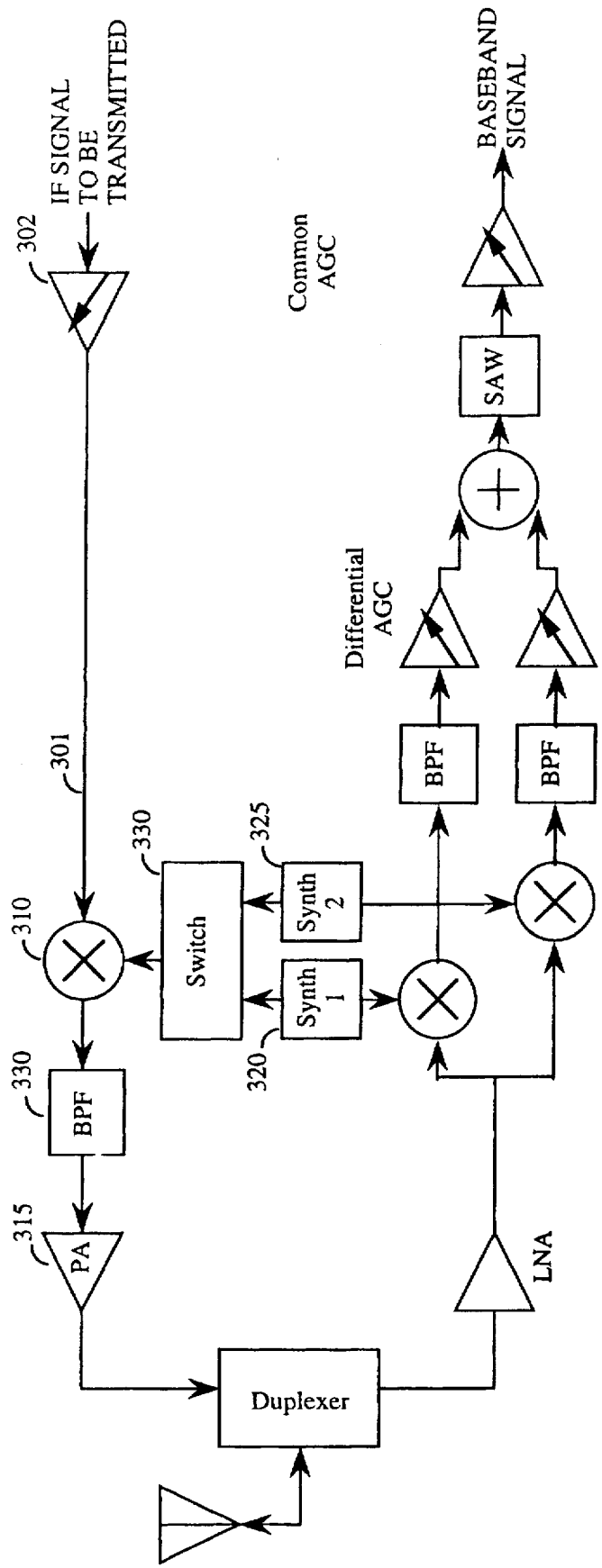
FIG. 3 shows another alternate embodiment of the multiple band radio of the present invention.

Yet another alternate embodiment is illustrated in FIG. 3. The structure and operation of the receive path of this embodiment is the same as the preferred embodiment. The transmit path (301) of this embodiment, however, is comprised of the common AGC amplifier (302), performing the same closed loop power control function as in the preferred embodiment, a mixer (310), a bandpass filter (330), and a power amplifier (315).

Two frequency synthesizers (320 and 325) each generate a signal having a different frequency. A switch or multiplexer (330) connects both of the frequency synthesizers to the mixer (310). The switch is controlled by the radio's microcontroller as are the frequency synthesizers (320 and 325). The radio can now rapidly switch between the first frequency synthesizer (320) and the second frequency synthesizer (325) as required by the frequency of each base station with which the radio is communicating. These frequencies are determined by the received signals since this alternate embodiment can still receive on multiple frequencies.

The output of the amplifier (302) is input to the mixer (310). The other input of the mixer (310) is connected to the switch (330). When synthesizer 1 (320) is needed, the switch connects it to the mixer (310). When synthesizer 2 (325) is needed, the switch (330) disconnects synthesizer 1 (320) and connects synthesizer 2 (325) to the mixer (310). If in other alternate embodiments additional synthesizers are used, the operation of the switch would be the same.

The bandpass filter (330) filters the output of the mixer (310). As in the preferred embodiment, the pass band of the filter (330) is adjusted depending on the signal desired from the mixer (310).

The output of the bandpass filter (330) is input to a power amplifier (315). As in the preferred embodiment, this amplifier is adjusted to the desired transmit power required for the cellular radio system in which the apparatus of the present invention operates.

The alternate embodiment of FIG. 3 cannot transmit on multiple frequencies simultaneously. However, it can receive and down convert multiple frequencies simultaneously. This embodiment requires fewer components and therefore is less expensive and needs less real estate on a printed circuit board than the preferred embodiment since it does not require additional amplifiers, mixers, and bandpass filters. Yet another advantage is that the power amplifier only has to transmit one frequency at a time. This is critical to maintain linearity and efficiency of the power amplifier.

We claim:

1. A method for transmitting same information simultaneously on a plurality of transmit frequencies with a dual mode radio communication device, a first mode being single frequency operation and a second mode being dual frequency operation, the radio communication device operating in a cellular radio environment having a plurality of base stations, each base station communicating within a cell, the method comprising the steps of:

generating a signal to be transmitted;

altering the signal by a first gain to produce a first gain adjusted signal;

altering the signal by a second gain to produce a second gain adjusted signal, said second gain being substantially zero in said first mode and non-zero in said second mode;

multiplying the first gain adjusted signal by a first oscillator signal having a first frequency to produce a first transmit frequency signal;

multiplying the second gain adjusted signal by a second oscillator signal having a second frequency to produce a second transmit frequency signal, said first and second transmit frequency signals carrying said same information;

summing the first and second transmit frequency signals to produce a summed signal;

power amplifying the summed signal to produce a power amplified signal; and radiating the power amplified signal from an antenna.

2. A method for receiving a same information signal simultaneously on a plurality receive frequencies with a dual-mode radio, a first mode being single frequency operation and a second mode being dual frequency operation, the dual-mode radio operating in a cellular radio environment having a plurality of base stations, each base station communicating within a cell, the method comprising the steps of:

receiving a first signal from a first base station and a second signal from a second base station when in said second mode, the first and second base stations being of the plurality of base stations, said first and second signals carrying said same information;

amplifying the first and second signals to produce an amplified received signal;

multiplying the amplified received signal by a first signal having a first frequency to produce a first down converted signal;

multiplying the amplified received signal by a second signal having a second frequency to produce a second down converted signal;

filtering the first and second down converted signals to produce first and second filtered signals;

altering the first filtered signal by a first gain to produce a first amplified, filtered signal;

altering the second filtered signal by a second gain to produce a second amplified, filtered signal, said second gain being substantially equal to zero when in said first mode and non-zero when in said second mode;

summing the first and second amplified, filtered signals to produce a summed signal; and filtering the summed signal.

3. The method of claim 2 wherein the first and second gains are determined in response to receive power levels of the first and second signals.

4. The method of claim 2 wherein the first gain is increased as the distance between the first base station and the radio communication device increases.

5. The method of claim 2 and further including the step of increasing the first gain until it is substantially equal to the second gain when the radio communication device is in a hand-off region between the first base station and the second base station.

6. A method for transmitting multiple signals, each signal having a different frequency, with a dual mode radio, a first mode being single frequency operation and a second mode being dual frequency operation, the radio having a transmit path comprising a plurality of mixing paths, the radio operating in a cellular radio environment having a plurality of base stations, each base station communicating within a cell, the method comprising the steps of:

generating a signal to be transmitted;

altering the signal by a gain to produce a gain adjusted signal;

if the radio is in the first mode, preventing the gain adjusted signal from being conducted through more than one mixing path;

if the radio is in the second mode, conducting the gain adjusted signal through at least two of the plurality of mixing paths;

multiplying each gain adjusted signal that is conducted through a mixing path of the plurality of mixing paths by a different oscillator signal, each oscillator signal having a different frequency to produce at least one transmit frequency signal;

if the radio is in the second mode, summing the at least one transmit frequency signal to produce a summed signal;

power amplifying the summed signal to produce a power amplified signal; and radiating the power amplified signal from an antenna.

7. A method for receiving multiple signals, each signal having a different frequency, with a dual mode radio, a first mode being single frequency operation and a second mode being dual frequency operation, the radio having a receive path comprising a plurality of down converting paths, the radio operating in a cellular radio environment having a plurality of base stations, the method comprising the steps of:

in the first mode, receiving a first signal from a first base station of the plurality of base stations;

in the second mode, receiving a plurality of signals from the plurality of base stations, the plurality of received signals each having a power level;

in response to the mode, amplifying either the first signal or the plurality of signals to produce a first amplified signal or a plurality of amplified signals;

in response to the mode, multiplying either the first amplified signal or each of the plurality of amplified signals by a synthesizer signal, each synthesizer signal having a different frequency, thus producing either a first down converted signal or a plurality of down converted signals;

in response to the mode, filtering either the first down converted signal or the plurality of down converted signals, to produce either a first filtered signal or a plurality of filtered signals;

in the first mode, altering the first filtered signal by a first gain to produce a first amplified signal;

in the second mode, altering a respective gain of each of the plurality of filtered signals in response to a respective power level of each of the plurality of received signals, thus producing a plurality of amplified signals;

in the second mode, summing the plurality of amplified signals to produce a summed signal;

in the first mode, filtering the first amplified signal to produce an output signal; and in the second mode, filtering the summed signal to produce said output signal.

8. A multiple band diversity apparatus that transmits, in a first mode, a same information signal simultaneously on a plurality of transmit frequencies through a transmit path and receives, in the first mode, a same communication signal simultaneously on a plurality receive frequencies through a receive path, the apparatus having a second mode for transmitting and receiving a single frequency signal, the apparatus comprising:

a plurality of mixing paths in the transmit path, each of said plurality of mixing paths for upconverting said same information signal to one of said plurality of transmit frequencies, each mixing path having a switch of a first plurality of switches and a mixer coupled to each switch, the plurality of mixing paths coupled to a signal to be transmitted, each mixing path providing said upconverted same information signal at an output;

a plurality of down converting paths in the receive path, each of said plurality of down converting paths for downconverting said same communication signal from one of said plurality of receive frequencies, each down converting path having a mixer that is coupled to a filter that is coupled to a switch of a second plurality of switches, each down converting path providing said downconverted same communication signal at an output;

a plurality of frequency synthesizers, each frequency synthesizer of the plurality of frequency synthesizers coupled to a different mixing path of the plurality of mixing paths and a different down converting path of the plurality of down converting paths;

a first summer coupled to the outputs of the plurality of mixing paths, the first summer outputting a summed transmit signal in response to the sum of each of the said upconverted same information signals; and a second summer coupled to the outputs of the plurality of down converting paths, the second summer outputting a summed receive signal in response to the sum of each of the said downconverted same communication signals.

9. The apparatus of claim 8 wherein in the second mode only one switch of the first plurality of switches and one switch of the second plurality of switches is closed and in the first mode all switches of both the first and second plurality of switches are closed.

10. A multiple frequency radio that receives a same communication signal on a plurality of frequencies simultaneously, the radio operating in a cellular radio environment comprising a plurality of base stations, each base station transmitting said same communication signal on said plurality of frequencies, the radio having a transmit path and a receive path, the radio comprising:

a multiplier, in the transmit path, a said multiplier having a plurality of inputs and an output, a first input of he plurality of inputs coupled to a signal to be transmitted;

a plurality of signal synthesizers, each generating a signal having a different frequency;

a multiplexing switch having a plurality of inputs and a switch output, each input coupled to a different one of the plurality of signal synthesizers, the switch output coupled to a second input of the plurality of inputs of the multiplier;

a transmit amplifier in the transmit path, said transmit amplifier having an input coupled to the multiplier output, said transmit amplifier providing an output signal of said transmit path;

a receive amplifier, in the receive path, said receive amplifier having an input coupled to a received signal;

a plurality of down converting paths in the receive path, each of said plurality of down converting paths for downconverting said same communication signal from one of said plurality of frequencies, each down converting path comprising a mixer having an input coupled to an output of the receive amplifier and an input coupled to a different one of the plurality of signal synthesizers, a filter coupled to an output of the mixer, and a differential amplifier having a variable gain, an input coupled to an output of the filter, and an output for providing said downconverted same communication signal at an output of said down converting path, said variable gain being determined by a distance between the radio and the plurality of base stations such that signals output from the plurality of differential amplifiers are substantially equal in amplitude to each other; and a summer in the receive path, said summer having an input coupled to the outputs of the plurality of differential amplifiers.

11. A method for transmitting same information simultaneously on a plurality of transmit frequencies with a dual mode radio communication device, a first mode being single frequency operation and a second mode being dual frequency operation, the radio communication device operating in a cellular radio environment having a plurality of base stations, each base station communicating within a cell, the method comprising the steps of:

generating a signal to be transmitted;

altering the signal by a first gain to produce a first gain adjusted signal;

altering the signal by a second gain to produce a second gain adjusted signal;

increasing the second gain until it is substantially equal to the first gain when the radio communication device is in a hand-off region between a first base station and a second base station;

multiplying the first gain adjusted signal by a first oscillator signal having a first frequency to produce a first transmit frequency signal;

multiplying the second gain adjusted signal by a second oscillator signal having a second frequency to produce a second transmit frequency signal, said first and second transmit frequency signals carrying said same information;

summing the first and second transmit frequency signals to produce a summed signal;

power amplifying the summed signal to produce a power amplified signal; and radiating the power amplified signal from an antenna.

12. A multiple frequency dual-mode receiver for receiving a same information signal simultaneously on a plurality receive frequencies, a first mode being single frequency operation and a second mode being dual frequency operation, said multiple frequency dual-mode receiver operating in a cellular radio environment having a plurality of base stations, said multiple frequency receiver comprising:

an antenna for receiving a first signal from a first of said plurality of base stations and a second signal from a second of said plurality of base stations when in said second mode, said first and second signals carrying said same information;

a receive amplifier, coupled to said antenna, for amplifying the first and second signals to produce an amplified received signal;

a first downconverter, coupled to said receive amplifier, said first downconverter for multiplying the amplified received signal by a first signal having a first frequency to produce a first downconverted signal;

a second downconverter, coupled to said receive amplifier, said second downconverter for multiplying the amplified received signal by a second signal having a second frequency to produce a second downconverted signal;

a first filter, coupled to said first downconverter, said first filter for filtering the first downconverted signal to produce a first filtered signal;

a second filter, coupled to said second downconverter, said second filter for filtering the second downconverted signal to produce a second filtered signal;

a first variable gain amplifier, coupled to said first filter, said first variable gain amplifier for altering the first filtered signal by a first gain to produce a first amplified, filtered signal;

a second variable gain amplifier, coupled to said first filter, said second variable gain amplifier for altering the second filtered signal by a second gain to produce a second amplified, filtered signal, said second gain being substantially equal to zero when in said first mode and non-zero when in said second mode;

a summer, coupled to said first and second variable gain amplifiers, said summer for summing the first and second amplified, filtered signals to produce a summed signal; and a third filter, coupled to said summer, said third filter for filtering the summed signal.

13. The multiple frequency receiver of claim 12 wherein said first variable gain amplifier alters said first filtered signal by said first gain in response to a receive power level of said first signal, and wherein said second variable gain amplifier alters said second filtered signal by said second gain in response to receive power level of said second signal.

14. The multiple frequency receiver of claim 12 wherein said first variable gain amplifier increases said first gain as a distance between said first base station and said multiple frequency receiver increases.

15. The multiple frequency receiver of claim 12 wherein said first variable gain amplifier increases said first gain until said first gain is substantially equal to said second gain when said multiple frequency receiver is in a hand-off region between said first and second base stations.

16. A multiple frequency receiver for receiving multiple signals, each signal having a different frequency, said multiple frequency receiver having a first mode being single frequency operation and a second mode being dual frequency operation, said multiple frequency receiver operating in a cellular radio environment having a plurality of base stations, said multiple frequency receiver comprising:

an antenna for receiving a first signal from a first base station of the plurality of base stations when in said first mode, and for receiving a plurality of signals from the plurality of base stations when is sad second mode, the plurality of received signal each having a power level;

a receive amplifier, coupled to said antenna, said receive amplifier for amplifying the first signal to produce a first amplified signal when in said first mode, and for amplifying the plurality of signals to produce a plurality of amplified signals when in said second mode;

a plurality of downconverters, each downconverter coupled to said receive amplifier, a first of said plurality of downconverters for multiplying said first amplified signal by a first of a plurality of synthesizer signals thereby porducing a first downconverted signal when in said first mode, and said plurality of downconverters further for respectively multiplying each of said plurality of amplified signals by a respective synthesizer signal of said plurality of synthesizer signals thereby producing a plurality of downconverted signals when in said second mode, each of said respective synthesizer signals having a different frequency;

a plurality of filters, each of said plurality of filters respectively coupled to a different one of said plurality of downconverters, a first of said plurality of filters for filtering said first downconverted signal thereby producing a first filtered signal when in said first mode, and said plurality of filters further for respectively filtering each of said plurality of downconverters signals thereby producing a plurality of filtered signals when in said second mode;

a plurality of variable gain amplifiers, each of said plurality of variable gain amplifiers respectively coupled to a different one of said plurality of filters, a first of said plurality of variable gain amplifiers for altering said first in said first mode, and said plurality of variable gain amplifiers further for altering a respective gain of each of said plurality of filtered signals in response to a respective power level of each of said plurality of received signals thereby producing a plurality of amplified signals when in said second mode;

a summer, coupled to each o said plurality of variable gain amplifiers, said summer for summing the plurality of amplified signals to produce a summed signal when in said second mode; and a filter, coupled o sad summer, for filtering said first amplified signal when in said first mode and for filtering said summed signal when in said second mode.

* * * * *